US008139881B2

United States Patent
Huguenel et al.

(10) Patent No.: US 8,139,881 B2
(45) Date of Patent: Mar. 20, 2012

(54) METHOD FOR LOCALLY ADJUSTING A QUANTIZATION STEP AND CODING DEVICE IMPLEMENTING SAID METHOD

(75) Inventors: Lila Huguenel, Rennes (FR); Dominique Thoreau, Cesson Sevigne (FR); Olivier Le Meur, Talensac (FR)

(73) Assignee: Thomson Licensing, Issy les Moulineaux (FR)

( * ) Notice: Subject to any disclaimer, the term of this patent is extended or adjusted under 35 U.S.C. 154(b) by 765 days.

(21) Appl. No.: 11/887,714

(22) PCT Filed: Mar. 16, 2006

(86) PCT No.: PCT/EP2006/060799
§ 371 (c)(1),
(2), (4) Date: Dec. 9, 2008

(87) PCT Pub. No.: WO2006/106030
PCT Pub. Date: Oct. 12, 2006

(65) Prior Publication Data
US 2009/0122862 A1 May 14, 2009

(30) Foreign Application Priority Data
Apr. 4, 2005 (FR) ...................... 05 50880

(51) Int. Cl.
*G06K 9/00* (2006.01)

(52) U.S. Cl. .... 382/251; 382/232; 382/239; 375/240.03

(58) Field of Classification Search .................. None
See application file for complete search history.

(56) References Cited

U.S. PATENT DOCUMENTS
6,490,319 B1 12/2002 Yang
6,529,631 B1 * 3/2003 Peterson et al. .............. 382/232

FOREIGN PATENT DOCUMENTS
WO WO 97/37322 10/1997

OTHER PUBLICATIONS

Ingo Hontsch and Lina J. Karam, "Adaptive Image Coding with Perceptual Distortion Control", Mar. 2002, IEEE Transactions on Image Processing, vol. 11, Issue 3, pp. 213-222.*
D. Chai et al: "Foreground/background bit allocation for region-of-interest coding" Image Processing, 2000, Proceedings. 2000 Int'l Conference on Sep. 10-13, 2000, Piscataway,NJ, vol. 2, pp. 923-926.
Searc Report Dated May 29, 2006.

* cited by examiner

*Primary Examiner* — Jason M Repko
*Assistant Examiner* — Siamak Harandi
(74) *Attorney, Agent, or Firm* — Robert D. Shedd; Jeffrey M. Navon

(57) ABSTRACT

The invention relates to a method of locally adjusting a quantization step for each region of an image with respect to a setpoint quantization step. The method comprises the steps of:
- assigning, to said region of interest, a first quantization step, lower than or equal to said setpoint quantization step;
- determining a second quantization step higher than or equal to said setpoint quantization step and lower than or equal to a third quantization step such that the number of bits required by the region of interest is lower than the number of bits saved on the potential masking region; and
- assigning, when such a second quantization step exists, said second quantization step to said potential masking region, otherwise assigning said third quantization step to said potential masking region.

10 Claims, 2 Drawing Sheets

METHOD FOR LOCALLY ADJUSTING A QUANTIZATION STEP AND CODING DEVICE IMPLEMENTING SAID METHOD

This application claims the benefit, under 35 U.S.C. §365 of International Application PCT/EP2006/060799, filed Mar. 16, 2006, which was published in accordance with PCT Article 21(2) on Oct. 12, 2006 in English and which claims the benefit of French patent application No. 0550880, filed Apr. 04, 2005.

1. BACKGROUND OF THE INVENTION

The invention relates to a method for locally adjusting a quantization step for each area or region in an image.

2. DESCRIPTION OF THE PRIOR ART

This invention applies to the field of video compression and, in particular, selective compression. Any method of selective compression of images with regions of interest involves two mechanisms: an a priori selection mechanism and an a priori compression mechanism:
   the selection of the information is a visual attention mechanism which defines the location of the events of interest contained in the image and the relative importance of these events in relation to each other;
   the a priori compression mechanism characterizes the nature and the encoding of the image and the criteria for allocation of the encoding resources, i.e. bit rate or quality.

Any compression method involves a quantization method for quantizing the data to be encoded. The invention relates more particularly to the local adjustment of the quantization step for each region in an image. According to conventional approaches, the local adjustment of the quantization step is performed for each macroblock (or for each block of pixels) according to their psycho-visual importance within an image. These approaches are used in particular to quantize more strongly less important macroblocks and, conversely, preserve, by reducing the associated quantization step, the important macroblocks (i.e. the macroblocks that attract the eye). However, with these approaches, the reconstruction quality (i.e. after decoding) of an important macroblock can vary strongly from one image to the next, which is a problem for an observer. Furthermore, the reconstruction quality can also vary within a region of interest.

3. SUMMARY OF THE INVENTION

The object of the invention is to resolve at least one of the drawbacks of the prior art. The invention relates to a method for adjusting locally a quantization step in an image with respect to a setpoint quantization step (QP*). The image comprises at least one region of interest and one potential masking region, each of the regions possibly comprising a number of disjoint groups of pixels. The region of interest and potential masking region are encoded in a first and a second number of bits respectively when they are quantized with the setpoint quantization step (QP*). According to the invention, the method comprises the following steps:
   assigning, to the region of interest, a first quantization step (QP_ROI_MIN$_j$), lower than or equal to the setpoint quantization step (QP*), the region being encoded in a third number of bits when it is quantized with the first quantization step;
   determining a second quantization step (QP_POT$_j$) higher than or equal to the setpoint quantization step (QP*) and lower than or equal to a third quantization step (QP_POT_MAX$_j$) such that the difference between the third and first numbers of bits is lower than or equal to the difference between the second number of bits and a fourth number of bits equal to the number of bits used to encode the potential masking region quantized with the second quantization step; and
   assigning, when such a second quantization step exists, the second quantization step (QP_POT$_j$) to the potential masking region, otherwise assigning the third quantization step (QP_POT_MAX$_j$) to the potential masking region.

According to a specific embodiment, the first quantization step (QP_ROI_MIN$_j$) is predetermined so as to ensure a predefined reconstruction quality (PSNR$^{max}_{ROI}$) of the region of interest when the first quantization step (QP_ROI_MIN$_j$) is used for coding the region of interest. The third quantization step (QP_POT_MAX$_j$) is predetermined so as to ensure a predefined reconstruction quality (PSNR$^{min}_{POT}$) of the potential masking region when the third quantization step (QP_POT_MAX$_j$) is used for coding the potential masking region.

According to another embodiment, the image further comprising a neutral region that possibly comprises disjoint groups of pixels, the setpoint quantization step (QP*) is assigned to the neutral region.

According to a specific embodiment, the image belonging to a sequence of images, the method is applied to each image of the sequence.

Preferentially, for a current image of the sequence, the value of the second quantization step assigned to the potential masking region is increased while:
   the ratio between the fourth number of bits and a fifth number of bits equals to the number of bits used to encode the potential masking region with the increased second quantization step is lower to a predefined threshold; and
   the increased second quantization step is lower or equal to the third quantization step (QP_POT_MAX$_j$).

Advantageously, the number of bits equal to the difference between the fourth number of bits and the fifth number of bits is used partly or totally to encode a region of interest in another image of the sequence.

The invention relates to a method for coding a sequence of images comprising a step for transforming the images in a set of coefficients, a step for quantizing each of the coefficients by a quantization step and a step for encoding the quantized coefficients wherein the quantization step is adjusted locally according to the method described above.

The invention also relates to a coding device for coding a sequence of n images comprising at least one region of interest and one potential masking region. The device comprises:
   means for transforming the images in a set of coefficients;
   quantization means for quantizing the coefficients with a quantization step adjusted locally in each image of the sequence with respect to a setpoint quantization step (QP*), the region of interest and potential masking region being encoded in a first and a second number of bits respectively when they are quantized with the setpoint quantization step (QP*); and
   coding means for coding the quantized coefficients.

According to the invention, the quantization means comprise:
   means for assigning, to the region of interest, a first predetermined quantization step (QP_ROI_MIN$_j$), lower than or equal to the setpoint quantization step (QP*), the region being encoded in a third number of bits when it is quantized with the first quantization step;

means for determining a second quantization step ($QP\_POT_j$) higher than or equal to the setpoint quantization step ($QP^*$) and lower than or equal to a third quantization step ($QP\_ROI\_MIN_j$) predetermined such that the difference between the third and first numbers of bits is lower than or equal to the difference between the second number of bits and a fourth number of bits equal to the number of bits used to encode the potential masking region quantized with the second quantization step; and means for assigning, when such a second quantization step, the second quantization step ($QP\_POT_j$) to the potential masking region, otherwise assigning the third quantization step ($QP\_ROI\_MIN_j$) to the potential masking region.

Preferentially, the coding device further comprises rate control means providing the quantization means with the setpoint quantization step ($QP^*$).

4. LIST OF FIGURES

The invention will be better understood and illustrated by means of exemplary embodiments and advantageous implementations, by no means limiting, with reference to the appended figures, in which.

5. DETAILED DESCRIPTION OF THE INVENTION

Figure 1:
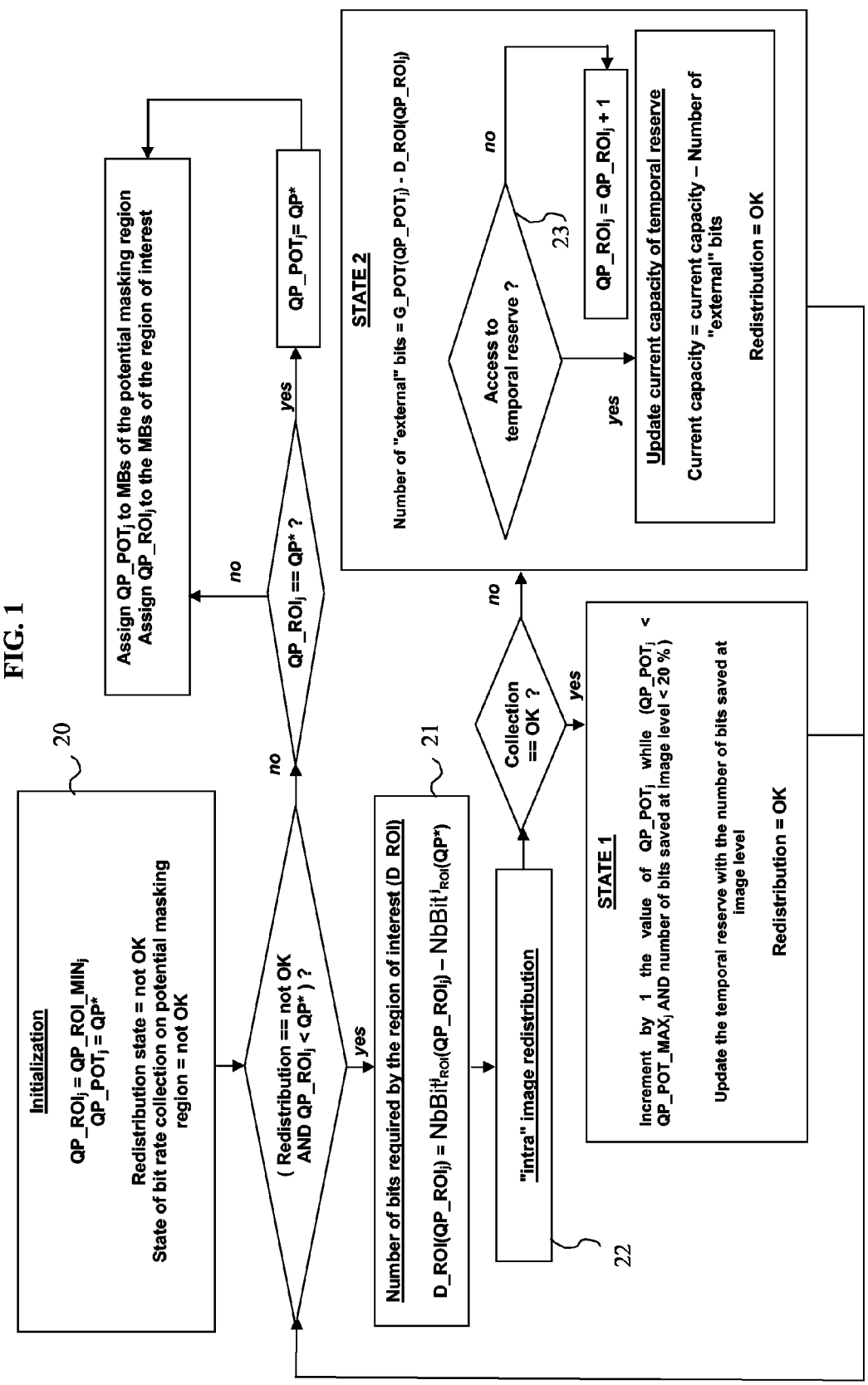
FIG. 1 illustrates a method, according to the invention, of adapting the quantization step for each region.

The invention relates to a method of locally adjusting a quantization step for each area or region of interest (i.e. regions attracting more attention) of an image with respect to a setpoint quantization step ($QP^*$). The image that is part of a sequence of a number of images is made up of blocks of pixels. By favouring a spatial region of interest in the method of locally adapting the quantization step at the expense of other regions of the image, the visual quality of the region concerned for a given overall bit rate is enhanced. Based on a selection of regions of interest in an image, the quantization step is adjusted locally according to the interest of these regions. This adjustment is performed in such a way as to compress more strongly the regions of low importance and to redistribute, along the sequence, the encoding resources (i.e. number of bits) that might not be used, to the regions of interest. This redistribution of bits from one image to another makes it possible to obtain a level of reconstruction quality (i.e. of quality after decoding) that is more stable for the regions of interest.

More specifically, the method according to the invention can be used to transfer bit rate from a region of non-interest to a region of interest. For this, the proposed solution uses the variation in the quantization step QP for each region in the image or local adjustment of the quantization step. This adjustment is made with respect to an initial setpoint of the value of the quantization step denoted $QP^*$ (for example, derived from bit rate regulation for each image) which corresponds to a setpoint bit rate $D^*$. More specifically, according to the invention, the quantization step for each region of the image will be modified according to the visual interest of the region. A positive variation of the quantization step provides for a stronger compression, i.e. a saving in bit rate at the cost of a loss in quality. A negative variation provides for a finer compression, i.e. an enhanced reconstruction quality, at the cost of an increase in encoding cost.

Consequently, the method requires knowledge of a priori information on the content. This a priori information used by the method according to the invention falls into two categories. The first category of a priori information on the content concerns the location of the region(s), in each image of the sequence, attracting more attention, called region of interest. This region may be made up of disjoint groups of blocks of pixels. This information can be given by a binary interest map I indicating, for each block $b_i$ in the image, its level of interest for the human visual system: $I(b_i)=1$ for a block $b_i$ of interest and $I(b_i)=0$ for a block $b_i$ of non-interest. This map can be obtained, for example, by thresholding a saliency map. A saliency map is a map that indicates, for each pixel in the image, its perceptual interest. This map can be constructed taking into account a variety of information, for example motion information. The greater the value associated with a pixel, the more the pixel attracts the eye. In order to obtain a saliency value for each block, it is possible to average, for a given block, the values associated with the pixels belonging to that block, or even to take the median value of the saliency values. More generally speaking, the invention can be applied to the case of non binary interest maps that characterizes for each block $b_i$ its level of interest. The second category of a priori information on the content concerns the location of the region, in each image of the sequence, which has a strong masking capability on the visual artefacts. This region may be made up of disjoint groups of blocks of pixels. The lossy compression methods used in digital video systems produce artefacts, the visibility of which depends strongly on the content of the images processed. The contrast masking effect translates this modification of the visibility of a signal into the presence of another signal. This modification can go in the direction of a reduction of the visibility threshold (facilitation), or even in the direction of an increase in the visibility threshold (masking). To limit the appearance of new artefacts in the blocks that are part of the region of non-interest, a priori information on the content is also given by a binary map P indicating, for each block $b_i$, its visual masking capability: $P(b_i)=1$ for a block with strong masking capability and $P(b_i)=0$ for a block with weak masking capability. This map can be obtained, for example, by thresholding an activity map. An activity map is a map that indicates, for a given block, its level of activity. This level can be calculated by measuring, for example, the variance of the block. In the rest of the document, the set of blocks $b_i$ of non-interest in the image having a strong masking capability is called "potential masking region". The set of blocks $b_i$ of non-interest that do not belong to the potential masking region is called "neutral region". The two binary maps respectively relating to the location of the region of interest and the region with strong masking capability are coupled in order to obtain a single map $I_{final}$ used for locally adjusting the quantization step and which associates with each block $b_i$ in the image a value 0, 1 or 2 as follows:

$$I_{Final}(b_i) = \begin{cases} 2 & \text{if } I(b_i) = 1: \text{region of interest} \\ 1 & \text{if } P(b_i) = 1 \text{ and } I(b_i) = 0: \text{Potential masking region} \\ 0 & \text{otherwise: Neutral region} \end{cases}$$

With:
$I_{Final}$ being the new map transmitted to the encoder indicating the region of interest and also the potential masking region from which will be applied the transfer of bits;
P being the binary map defining the potential masking region; and
I being the binary map defining the region of interest and of non-interest.

The method also makes use of PSNR(QP) curves (curves representing the peak signal-to-noise ratio as a function of the quantization step) and NbBit(QP) curves (curves representing the number of bits as a function of the quantization step) that are specific to each of the regions of interest and potential masking regions. The PSNR is a criterion that is used to characterize an image quality. In this case, the PSNR is used to characterize the reconstruction quality after decoding an image, a block or a region in an image. The PSNR is then defined as follows:

$$PSNR = -10\log_{10}\left(\frac{(SSE)}{N \cdot M \cdot 255^2}\right)$$

in which SSE is the sum of the squared errors. The SSE is defined for a block by the sum on the block of the pixel-by-pixel differences between the values associated with the pixels in the source image and the values associated with the corresponding pixels in the reconstructed image, i.e. the decoded image.

According to the invention, other quality criteria can be used. Before redistributing bits from certain regions of the image to other regions, a learning step for each image j of the sequence is needed in order to construct, around the value QP*, the portions of the curves defined above. These portions of curves may also be provided by external means for example through data files. It consists in encoding each block of pixels (for example, macroblock of size 16 by 16 pixels) belonging either to the region of interest, or to the potential masking region of the image, using three different quantization steps: QP*−L, QP*+K and QP*. After reconstruction (i.e. decoding) of the encoded blocks belonging to the region of interest, the data (PSNR and NbBit) relating to these blocks for a given quantization step value (QP*−L, QP*+K or QP*) is averaged in order to obtain, for the region of interest in the image j and for each of the three quantization step values, a $PSNR^j_{ROI}$ value and a number of bits value ($NbBit^j_{ROI}$). Similarly, the data relating to the blocks belonging to the potential masking region is averaged in order to obtain, for the potential masking region in the image j and for each of the three quantization step values, a $PSNR^j_{POT}$ value and a number of bits value ($NbBit^j_{POT}$). The curves $PSNR^j(QP)$ and $NbBit^j(QP)$ are then interpolated by linear interpolation between the three values QP*−L, QP*+K and QP* in order to obtain, for the image j: for the region of interest, a curve $PSNR^j_{ROI}(QP)$ and a curve $NbBit^j_{ROI}(QP)$, and for the potential masking region, a curve $PSNR^j_{POT}(QP)$ and a curve $NbBit^j_{POT}(QP)$.

The principle of the transfer or redistribution of bits ("intra" image redistribution) consists in compressing more strongly (with respect to an initial encoding based on a setpoint quantization step QP*) the blocks belonging to the potential masking region and in using for encoding the region of interest, the bits not used for encoding the potential masking region (compared to the number of bits $NbBit^j_{POT}(QP^*)$). According to the method, a stronger quantization step can be used to quantize a block of the potential masking region, provided that a minimum predefined value $PSNR^{min}_{POT}$ of the reconstruction quality associated with a potential masking region (for example 20 dB) is respected. Similarly, a maximum predefined value $PSNR^{max}_{ROI}$ of the reconstruction quality is fixed for the region of interest (for example, 35 dB). These values can be fixed automatically or manually (for example, by an operator). The method according to the invention consists in locally adapting the quantization step by transferring bits from the potential masking region to the region of interest while being careful to maintain an overall bit rate for the sequence that is roughly similar to the setpoint bit rate D*. The redistribution of bits is necessarily dependent from one image to another. According to the invention, a temporal transfer of bits between the images of the sequence can also be carried out ("inter" image redistribution). The temporal transfer of bits entails retaining, in a temporal reserve, the bits not used to encode an image, in order, if necessary, to use them to encode regions of interest in subsequent images. The temporal reserve may be considered as a counter of bits. Advantageously, the bit rate allocated at image level can vary from image to image. In practice, it is sometimes possible to retain bits from the potential masking region, in the temporal reserve, that are not used to encode the region of interest of the same image. Conversely, when the saving in number of bits from the potential masking region is insufficient to respond to the quality constraint of the region of interest, use of external bits (originating from the temporal reserve) to encode the current image is allowed, which inevitably increases the image bit rate. In practice, the bit rate at image level is allowed to vary only by a certain percentage (for example 20%) with respect to the setpoint bit rate associated with said image (i.e. to the bit rate associated with the image when the latter is encoded with the quantization step QP*) in order to avoid having an image use all the external bits. For each region involved in the selective compression system (i.e. the region of interest and the potential masking region), a set of so-called valid values for the quantization step is defined. These values are determined from PSNR(QP) curves (modelled for each region) so as to respect a reconstruction quality satisfying the PSNR requirements, minimum and maximum respectively, in the potential masking region and the region of interest. For the potential masking region in the image j, the values of the quantization step that can be assigned to the potential masking region vary between the setpoint value QP* and the highest value (denoted QP_POT_MAX$_j$) that makes it possible to guarantee the minimum reconstruction quality $PSNR^{min}_{POT}$. The same principle is applied to the region of interest. The values of the quantization step that can be assigned to the region of interest in the image j vary between the smallest value of the quantization step (denoted QP_ROI_MIN$_j$) that makes it possible to achieve the current maximum reconstruction quality $PSNR^{max}_{ROI}$ and the setpoint value QP*.

The method according to the invention therefore comprises two steps. In a first step, the adjustment within the current image j (or "intra" image redistribution) of the quantization step of the potential masking region QP_POT$_j$ and region of interest QP_ROI$_j$ is performed in order to reach the quality and bit rate constraints. Depending on the result of this distribution, in a second step, a transfer of bits not used in the encoding of past images ("inter" image redistribution) can be envisaged. After having determined the range of the values of the quantization step for the potential masking regions and regions of interest that can be used to satisfy the reconstruction quality constraints, the quantization step of the potential masking region and that of the region of interest are adjusted jointly:

for the region of interest: the minimum value of the quantization step QP_ROI_MIN$_j$ is used then, if necessary, increased until a quality level is obtained that can be produced by the transfer of bits originating from the potential masking region and, when appropriate, from the temporal reserve, for the potential masking region: the value of the quantization step is increased progressively until the demand in bits from the region of interest can be compensated and, when appropriate, the temporal reserve can be filled.

The "intra" image bit redistribution method is described below and illustrated by FIG. 1 and FIG. 2. It can culminate in two particular redistribution states that are described later in the document. Two variables are used, "Redistribution" and "Collection", that can take two values: OK or not OK.

---

Step 20: Initialization
Redistribution = not OK
Collection = not OK
//Path of curve NbBit$^j_{ROI}$(QP)
QP_ROI$_j$ = QP_ROI_MIN$_j$
QP_POT$_j$ = QP*
While Redistribution = not OK AND QP_ROI$_j$ < QP*
  Do
    Step 21: Bits resources demand by the region of interest
    D_ROI(QP_ROI$_j$) = NbBit$^j_{ROI}$(QP_ROI$_j$) − NbBit$^j_{ROI}$(QP*)
    Step 22: Intra image redistribution (to satisfy the bit rate constraint)
      //Path of curve NbBit$^j_{POT}$(QP)
      QP_POT$_j$ = QP* + 1
      While Collection = not OK AND QP_POT$_j$ <= QP_POT_MAX$_j$
        Do
        Step 220: Bits resources saving on the potential masking region
        G_POT(QP_POT$_j$) = NbBit$^j_{POT}$(QP*) − NbBit$^j_{POT}$(QP_POT$_j$)
        If(G_POT (QP_POT$_j$)>= D_ROI(QP_ROI$_j$)
        Then collection = OK
        Else QP_POT$_j$= QP_POT$_j$ + 1 (Search for higher compression)
        End Do
      End While
      If collection = OK
      Then STATE 1
      Else STATE 2
  EndDo
End While

---

STATE 1: State 1 is reached when the adjustment for each region makes it possible to obtain a valid quantization step (i.e., between QP* and QP_POT_MAX$_j$) for the potential masking region allowing to respond to the demand in bits from the region of interest, i.e. to reach the value of the current maximum reconstruction quality level PSNR$^{max}_{ROI}$. In other words, the number of bits saved on the potential masking region can be used to enhance the region of interest.

Furthermore, to perform a temporal transfer of bits, it is necessary whenever possible to feed bits to the temporal reserve. Thus, the quantization step of the potential masking region is forced to a higher value than that determined previously so as to reduce by no more than 20% the number of bits needed to encode the image.

STATE 2: State 2 is reached when, for a given quality level of the region of interest, the maximum value of the quantization step of the potential masking region does not make it possible to recover enough bits to redistribute them to the region of interest. The number of bits that have to be added in addition to those transferred from the potential masking region can, under certain conditions, be recovered from the temporal bit reserve.

Figure 2:
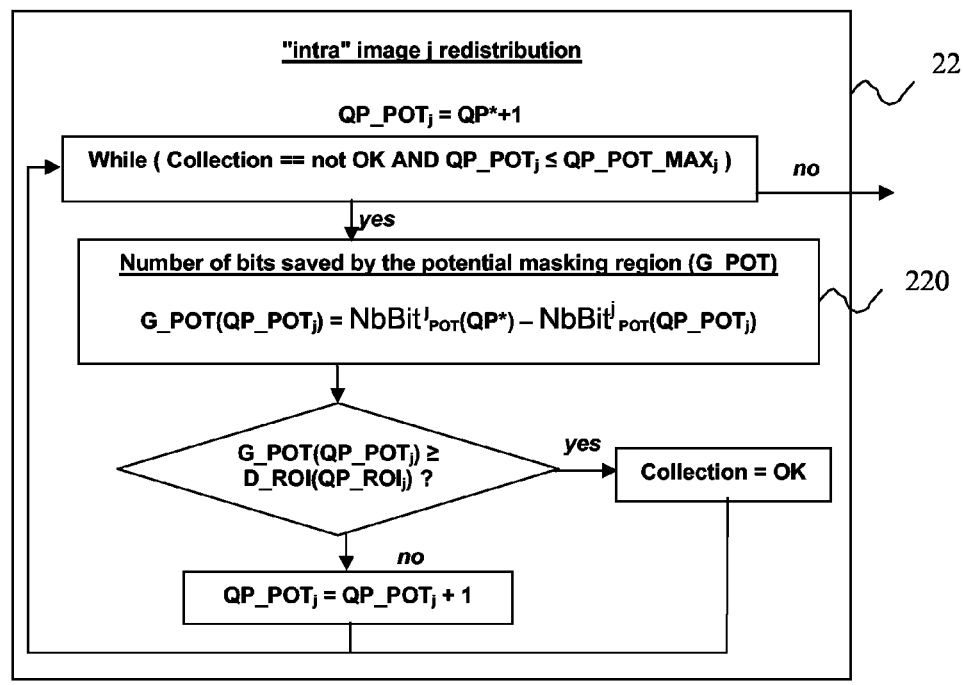
FIG. 2 illustrates a method of redistributing bits between different regions of one and the same image according to the invention.

The redistribution of bits with temporal transfer, illustrated by FIG. 1, takes place when the maximum saving in bit rate expected on the potential masking region does not make it possible to respond to the quality demand of the region of interest. It is then necessary to compensate the number of bits not supplied by the current potential masking region with bits possibly not used in the encoding of the images processed previously and fed into the temporal reserve. The transfer of bits from the temporal reserve is authorized 23 if the following conditions are observed:

the number of "external" bits D_ROI required by the region of interest is available within the temporal reserve;

the demand in "external" bits must not exceed 20% of the initial bit rate of the image (corresponding to the quantization of the image by QP*) in order to observe the image bit rate variation constraint.

If these two conditions are met, access to the temporal bit reserve is allowed and it is then possible to provide a high quality level for the region of interest. Otherwise, the redistribution process is recommenced in full, but with a maximum reconstruction quality constraint for the region of interest that is lower than the current maximum reconstruction quality level, i.e. QP_ROI$_j$ is increased for example by one. The method of locally adjusting the quantization step is stopped when the demand from the region of interest is satisfied, either on the basis of an "intra" image distribution or on the basis of an "inter" image distribution. The temporal bit rate redistribution makes it possible to achieve higher quality levels compared to those obtained from a purely "intra" image redistribution. Being able to temporally redistribute the bits from the selective compression of the potential masking region also makes it possible to obtain a more stable quality level for the region of interest.

As for the blocks or macroblocks (MBs) of the neutral regions, they are considered to be neutral with respect to a selective encoding strategy, i.e. the quantization step assigned to these blocks corresponds to the setpoint quantization step QP*, i.e., there is no local adaptation of the quantization step.

The invention also relates to a coding method for coding a sequence of n images implementing the quantization method according to the invention. The coding method thus comprises a step for transforming the n images of the sequence in a set of coefficients, for example using a DCT, a step for quantizing said coefficients by a quantization step that is adapted locally within the n images of the sequence according to the method described above and a step for encoding said quantized coefficients (e.g. using an entropy coding process).

Figure 3:
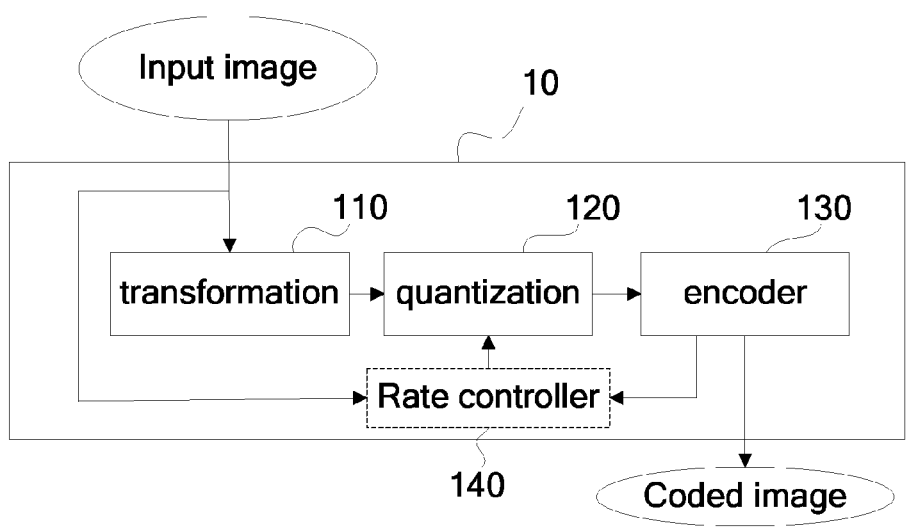
FIG. 3 represents a video coding device implementing the method according to the invention.

The invention also relates to a coding device 10 for coding a sequence of images depicted on FIG. 3. Only the essential modules are depicted on FIG. 3 and described hereinafter. The coding device comprises a module 110 to transform the source images at the input of the coding device in a set of coefficients (e.g. DCT coefficients). The module 110 implements for example a DCT transform. The coefficients are then quantized by a quantization module 120 in order to obtain quantized coefficients. The quantization module 120 is adapted to implement the method of local adjustment of quantization step according to the invention. The quantized coefficients are then encoded by a coding module 130 known by the skilled person, e.g. an entropic encoder. According to a specific embodiment, the coding device 10 comprises a rate control module 140. The module 140 is able to provide the quantization module 120 with the setpoint quantization step QP*.

Of course, the invention is not limited to the embodiments mentioned above. In particular, those skilled in the art can add any variant to the embodiments disclosed and combine them to benefit from their various advantages. Criteria other than the conventional PSNR can be used to characterize the reconstruction quality of an image, of a block of pixels or of a region in an image, such as, for example, a PSNR weighted according to the variance, a criterion based on a psycho-visual modelling. Similarly, the curves of PSNR(QP) and NbBit(QP) can be obtained by means other than those described. Thus, more than three quantization steps can be used to interpolate the curves. Similarly, another type of interpolation can be used such as, for example, a polynomial interpolation. It is also possible to envisage using previously encoded images to deduce from them the curves associated with the regions of interest and masking regions in the current image.

The interest maps can be non binary maps, characterizing, for each block in an image, its higher or lower level of interest. These maps can be used to define a number of regions of interest in an image, the bits being reallocated for each region according to its level of interest.

The coding device 10 may also comprise other modules such as a motion estimator, coding mode decision modules, etc.

The invention claimed is:

1. Method for adjusting locally a quantization step in an image relative to a setpoint quantization step, said image comprising at least one region of interest and one potential masking region, each of said regions possibly comprising a number of disjoint groups of pixels, said region of interest and potential masking region being encoded in a first and a second number of bits respectively when they are quantized with said setpoint quantization step, wherein it comprises the following steps:
    assigning, to said region of interest, a first quantization step, lower than or equal to said setpoint quantization step, said region being encoded in a third number of bits when it is quantized with said first quantization step;
    determining a second quantization step higher than or equal to said setpoint quantization step and lower than or equal to a third quantization step such that the difference between said third and first numbers of bits is lower than or equal to the difference between the second number of bits and a fourth number of bits equal to the number of bits used to encode said potential masking region quantized with said second quantization step; and
    assigning when such a second quantization step exists, said second quantization step to said potential masking region, otherwise assigning said third quantization step to said potential masking region.

2. Method according to claim 1, wherein said first quantization step is predetermined so as to ensure a predefined reconstruction quality of said region of interest when said first quantization step is used for coding said region of interest.

3. Method according to claim 1, wherein said third quantization step is predetermined so as to ensure a predefined reconstruction quality of said potential masking region when said third quantization step is used for coding said potential masking region.

4. Method according to claim 1, wherein, said image further comprising a neutral region that possibly comprises disjoint groups of pixels, the setpoint quantization step is assigned to said neutral region.

5. Method according to claim 1, wherein said image belonging to a sequence of images, said method is applied to each image of said sequence.

6. Method according to claim 5, wherein, for a current image of said sequence, the value of the second quantization step assigned to said potential masking region is increased while:
    the ratio between the fourth number of bits and a fifth number of bits equals to the number of bits used to encode said potential masking region with said increased second quantization step is lower to a predefined threshold; and
    said increased second quantization step is lower or equal to said third quantization step.

7. Method according to claim 6, wherein the number of bits equal to the difference between the fourth number of bits and the fifth number of bits is used partly or totally to encode a region of interest in another image of said sequence.

8. Method for coding a sequence of images comprising a step for transforming said images in a set of coefficients, a step for quantizing each of said coefficients by a quantization step and a step for encoding said quantized coefficients wherein said quantization step is adjusted locally according to claim 5.

9. Coding device for coding a sequence of n images comprising at least one region of interest and one potential masking region, each of said regions possibly comprising a number of disjoint groups of pixels, said device comprising:
    means for transforming said images in a set of coefficients;
    quantization means for quantizing said coefficients with a quantization step adjusted locally in each image of said sequence with respect to a setpoint quantization step, said region of interest and potential masking region being encoded in a first and a second number of bits respectively when they are quantized with said setpoint quantization step;
    coding means for coding said quantized coefficients;
    wherein said quantization means comprise:
        means for assigning, to said region of interest, a first predetermined quantization step, lower than or equal to said setpoint quantization step, said region being encoded in a third number of bits when it is quantized with said first quantization step;
        means for determining a second quantization step higher than or equal to said setpoint quantization step and lower than or equal to a third quantization step predetermined such that the difference between said third and first numbers of bits is lower than or equal to the difference between the second number of bits and a fourth number of bits equal to the number of bits used to encode said potential masking region quantized with said second quantization step; and
        means for assigning, when such a second quantization step, said second quantization step to said potential masking region, otherwise assigning said third quantization step to said potential masking region.

10. Coding device according to claim 9 further comprising a rate control means providing said quantization means with said setpoint quantization step.

* * * * *